W. T. McPHETRIDGE.
UNIVERSAL ANGLE INDICATOR FOR PORTABLE MACHINERY.
APPLICATION FILED JUNE 21, 1909.
944,810.
Patented Dec. 28, 1909.
2 SHEETS—SHEET 1.
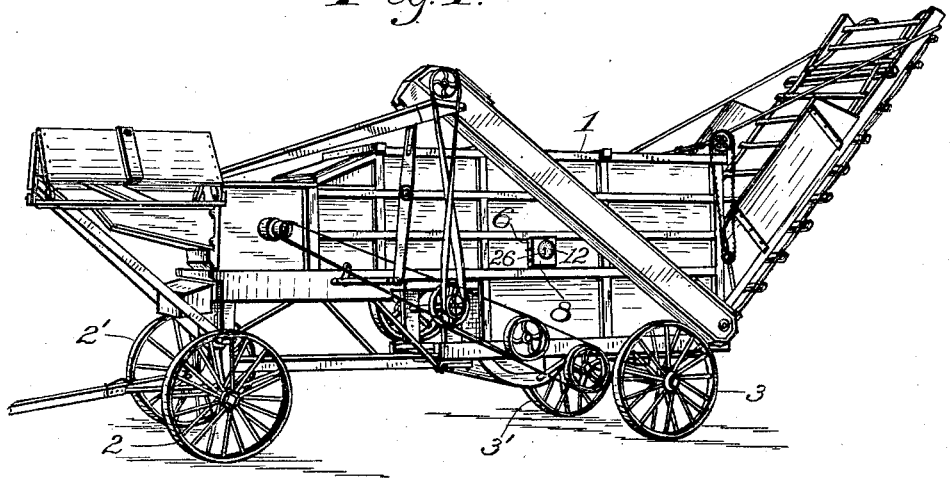
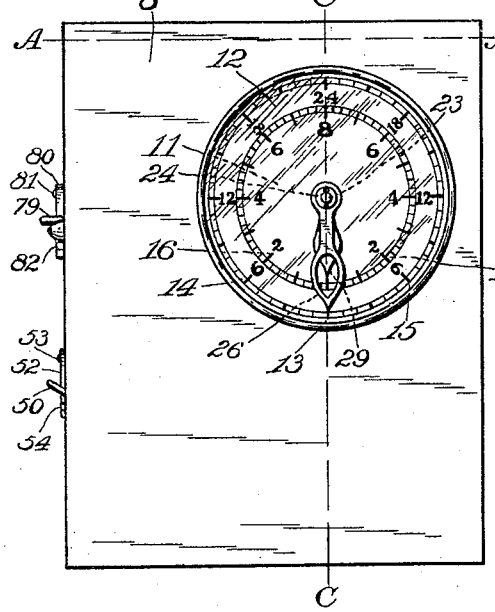
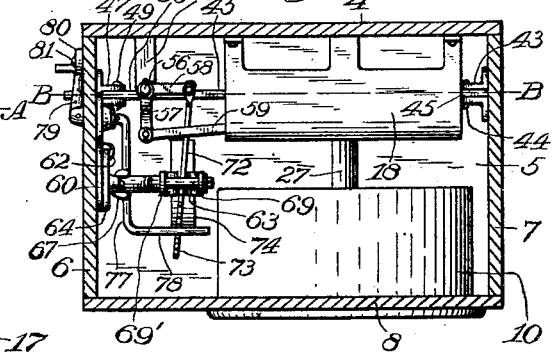
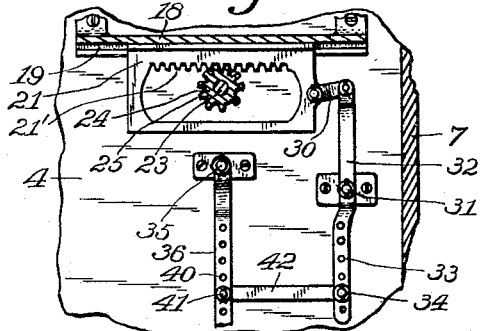
WITNESSES:
J. H. Gardner.
K. R. Woddell.
INVENTOR:
W. T. McPhetridge,
BY
E. T. Silvius,
ATTORNEY.

W. T. McPHETRIDGE.
UNIVERSAL ANGLE INDICATOR FOR PORTABLE MACHINERY.
APPLICATION FILED JUNE 21, 1909.
944,810.
Patented Dec. 28, 1909.
2 SHEETS—SHEET 2.
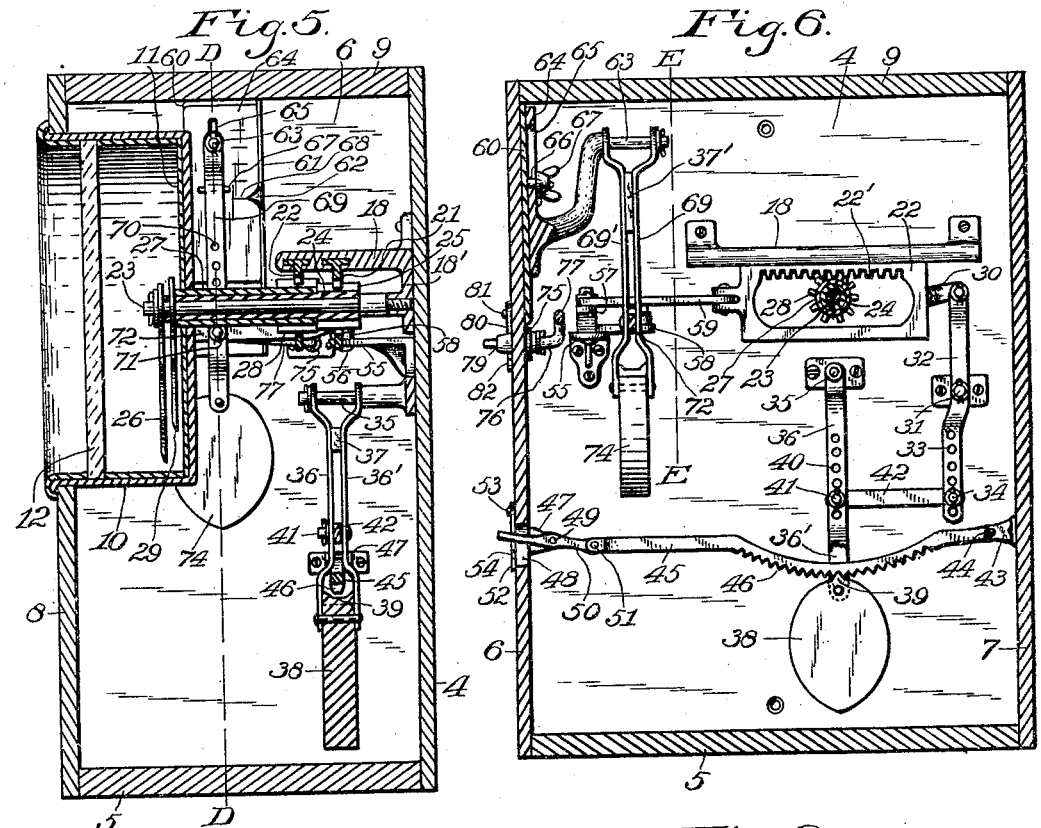
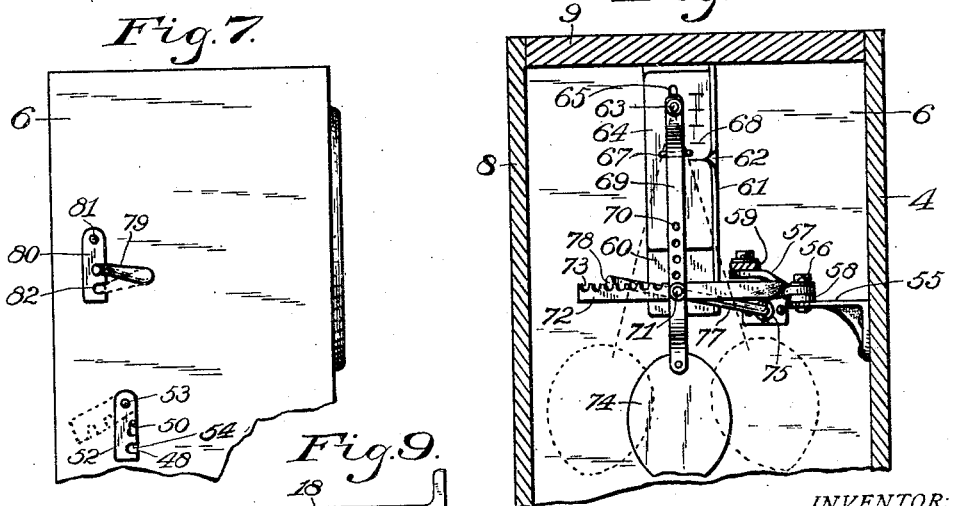
WITNESSES:
J. H. Gardner
K. R. Woddell
INVENTOR:
W. T. McPhetridge,
BY
E. T. Silvius,
ATTORNEY.

UNITED STATES PATENT OFFICE.

WILLIAM T. McPHETRIDGE, OF BEAN BLOSSOM TOWNSHIP, MONROE COUNTY, INDIANA, ASSIGNOR OF ONE-HALF TO ORLA W. SMITH, OF BAKER TOWNSHIP, INDIANA.

UNIVERSAL ANGLE-INDICATOR FOR PORTABLE MACHINERY.

944,810. Specification of Letters Patent. Patented Dec. 28, 1909.

Application filed June 21, 1909. Serial No. 503,327.

*To all whom it may concern:*

Be it known that I, WILLIAM T. McPHETRIDGE, a citizen of the United States, residing in Bean Blossom township, in the county of Monroe and State of Indiana, have invented certain new and useful Improvements in Universal Angle-Indicators for Portable Machinery; and I do declare the following to be a full, clear, and exact description of the invention, reference being had to the accompanying drawings, and to the letters and figures of reference marked thereon, which form a part of this specification.

This invention relates to instruments for indicating angles relative to horizontals or verticals, and has reference more particularly to an indicator that is adapted to be used on portable machinery whereby it may be determined when the machine is set in the desired position for proper operation, either level or inclined as may be best suited.

The object of the invention primarily is to provide a relatively inexpensive and reliable indicator that will be adapted for universal use to indicate horizontals and verticals, or deviations therefrom, and particularly to indicate when a machine is placed in the proper position for operation, especially threshing-machines or separators and other machinery.

With the above-mentioned and other objects in view the invention consists in an instrument comprising two pendulum-like plummets, two pointers connected respectively with the plummets, and a dial having two systems of markings thereon for indicating relative positions with respect to the horizontal; and the invention consists further in the novel parts, and the combinations and arrangements of parts, as hereinafter particularly described and then defined in the accompanying claims.

Referring to the drawings, Figure 1 is a perspective view of a portable separator to which the invention is applied to illustrate the function thereof; Fig. 2, a front elevation of the instrument; Fig. 3, a horizontal sectional view approximately on the line A A in Fig. 2; Fig. 4, a fragmentary vertical section approximately on the line B B in Fig. 3; Fig. 5, a vertical sectional view approximately on the line C C in Fig. 2; Fig. 6, a vertical sectional view approximately on the line D D in Fig. 5; Fig. 7, a fragmentary side elevation of the instrument; Fig. 8, a fragmentary vertical sectional view approximately on the line E E in Fig. 6; and Fig. 9, an end elevation of a guide that constitutes a part of the instrument.

Similar reference characters throughout the drawings indicate like elements or features of construction referred to herein.

In the drawings the numeral 1 indicates a well known type of separator or thresher, 2 and 2' the forward wheels, and 3 and 3' the rear wheels for supporting and transporting the machine which, as is well known should be placed in a level position when in use, the indicator being mounted on one side of the machine so that when setting the machine preparatory to beginning operations it may be first ascertained whether the machine is level or the amount it may be out of level, so that either of the wheels may be readily raised or lowered to bring the machine to the desired level position, or if desired the machine may be either raised or lowered at either end, so as to be more or less inclined if it be preferred that the movement of the grain be accelerated toward one end of the machine.

The indicator comprises a case that has a back 4 which is intended to be placed in vertical position, a bottom 5 and two sides 6 and 7 connected to the back, a front 8 connected to the bottom and sides, and a top 9 connected to the back and sides and also to the front, the front 8 having a suitable opening therein in which is mounted a circular frame 10 having an indicating dial 11 mounted in the inner end thereof, there being a protecting glass plate 12 mounted in the frame forward of the dial. The face of the dial has suitable markings thereon arranged in concentric circles, the lower portion of the dial as at 13 being understood as the "zero" point from which the markings in the form of scales begin and extend to the right and to the left thereof, there being equal spaces indicated and designated as at 14 to the left, and 15 to the right, near the periphery of the dial, and numbered as "6", "12", "18", to designate for instance six inches elevation that one axle of the machine may be above that of the other axle, the distance of the axles apart being known, as for instance twenty-five feet, so that the degree of inclination would read as inches in the ratio of twenty-five feet in length. An inner circle is likewise laid off on the dial to scale and has markings, as 16 and 17 to indicate inches of inclination transversely of the machine or that of either axle, being designated as inches with respect to the distance between the wheels on the axle, so that if the tread of the wheels be five feet the markings would indicate inches in inclination in five feet, thus enabling the operator to readily determine the thickness of block that might be required under a wheel to raise it the desired amount. A guide-bar 18 is mounted on the inner side of the back 4 near the side 7 and extends toward the front 8, the guide-bar having a base 18′ for supporting it firmly, and the under side of the guide-bar has two guide grooves 19 and 20 therein that are arranged in parallel order one to the other. A rack-bar 21 is mounted slidingly in the guide groove 19 and has gear-teeth 21′ thereon, a rack-bar 22 being mounted slidingly in the guide-groove 20 and having gear-teeth 22′ thereon. An axial shaft 23 is mounted on the base 18′ and extends horizontally forward through the dial 11. A hollow shaft 24 is mounted rotatably on the shaft 23 and has gear-teeth 25 on its inner end composing a pinion that is in engagement with the gear teeth 21′, the outer end of the shaft 24 having a pointer or indicator hand 26 secured thereto and extending to the scale at the periphery of the dial, the end portion of the pointer preferably having an opening therein. Another hollow shaft 27 is mounted rotatably on the shaft 24 and has gear-teeth 28 composing a pinion on its inner end that engages the gear-teeth 22′, the outer end of the shaft having a pointer or indicator hand 29 secured thereto and extending opposite the dial to the inner indicator scale. The pointer 26 as will be seen is designed to indicate the inclination of the machine longitudinally and the other pointer 29 to indicate the inclination of the machine transversely. A connecting rod 30 is pivoted to the rack bar 21 for its operation and control. A pivot 31 is mounted on the back 4 near the side 7, a lever 32 being pivotally mounted between its ends on the pivot and having one of its ends pivotally connected to the connecting rod 30, the opposite end portion of the lever having pivotal holes 33 therein in one of which is a pivot 34. Another pivot 35 is mounted on the back 4 below the rack-bar. A pendulum-like plummet comprises two rods 36 and 36′ connected together by a spacing-block 37, mounted to swing on the pivot 35, and a relatively heavy bob 38 secured to the rods, the top of the bob having a tooth-shaped projection 39 thereon between the two rods, the latter having a suitable number of pivotal holes 40 therein to receive a pivot-pin 41 to which is connected a coupling rod 42 which is connected to the pivot-pin 34, so that when the plummet swings on the pivot 35 the lever 32 is moved about its pivot and moves the rack-bar 21 slidingly so as to move the pointer 26 along the indicator scale on the dial. A bracket 43 is mounted on the side 7 and has a pivot 44 to which is connected a bar 45 that extends through between the rods 36 and 36′ and has gear teeth 46 thereon to engage the tooth 39 for preventing movement of the plummet when the machine is being moved from place to place; and in order to control the bar 45 a bracket 47 is mounted on the side 6 adjacent to a slot 48 that is cut in the side 6, the bracket supporting a pivot 49 on which a lever 50 is mounted that has its inner end connected to the bar 45 by a pivot 51, the outer end of the lever extending through the slot so that it may be operated by hand, and it is provided with a latch comprising a bar 52 that is connected to the outer side of the side 6 by a pivot 53, one side of the bar having notches 54 therein to receive the end of the lever 50, the bar 52 hanging downward by gravity and normally preventing vertical movement of the lever when the lever is in one of the notches, it being apparent that when the outer end of the lever 50 is moved upward as in Fig. 6 the plummet is locked and will be released when the lever is moved downward so as to raise the bar 45.

In order to operate the other pointer 29 a bracket 55 is mounted on the interior of the case, preferably on the back 4, and has a vertical pivot 56 thereon supporting a bell-crank comprising two arms 57 and 58, a connecting rod 59 being pivotally connected to the arm 57 and also to the rack-bar 22. A base-plate 60 is suitably mounted fixedly on the side 6 of the case and has a vertical guide flange 61 thereon provided with an indicating finger 62. A pivot 63 is provided with a base-plate 64 having a vertical slot 65 therein and a securing bolt 66 connected to the base plate 60 and extending through the slot, the bolt being provided with a thumb-nut 67 whereby the plate 64 is secured adjustably to the plate 60; so that the pivot 63 may be adjusted to various heights, the plate 64 having markings 68 thereon to be brought opposite the finger 62. A plummet comprises two bars 69 and 69′ that are connected together by a spacing-block 37′ and are mounted to swing on the pivot 63, the bars having a suitable number of pivotal holes 70 therein spaced apart to correspond to the spaces between the marks 68, one of the holes 70 having a pivot-pin 71 therein to which is pivotally connected a coupling-bar 72 that is pivotally connected also to the arm 58 of the bell-crank, the coupling-bar 72 having notches 73 in the top thereof, and a bob 74 is secured to the rods 69 and 69′ so that it swings parallel to the side 6 of the case and consequently in a vertical plane that is at right angles to the vertical plane in which the bob 38 swings. A journal-box 75 is mounted on the side 6 of the case and supports a rock-shaft 76 on which is an arm 77 having a lateral finger 78 that may be moved by the arm into a notch 73 of the arm 72 for preventing movement of the plummet and consequently the rack-bar 22 and the pointer 29. The rock shaft extends through the side 6 and has an operating lever 79 thereon that may be secured against movement by a latch comprising a bar 80 mounted on the exterior of the side 6 by means of the pivot 81, the bar hanging by gravity and having notches 82 therein to receive the end of the lever 79 for latching it.

The instrument may be adapted for use on machines of different proportions by shifting the pivot-pins 34 or 41 for different lengths of wheel-base of the machines, and shifting the pivotal pins 63 and 71 for different widths of tread of wheels or width of machines, as will be understood, in order to increase or decrease the movements of the pointers relatively to degrees of movements of the plummets, as may be required.

In practical use, the plummets are usually latched when the machine that is provided with the indicator is moving from place to place, and as will be apparent they may be latched in any position in which they may happen to be hanging, whether plumb or not. When the machine is moved to the place where it is to be operated the plummets are unlatched, and then the positions of the pointers 26 and 29 are noted with respect to the marking on the dial, after which the wheels of the machine are either raised or lowered as may be required to either level the machine, or to bring it to level position transversely and inclined longitudinally, as may be desired, the pointers hanging in plumb positions when the machine is level, and when the machine is not level, the amount of inclination in the width and length of the machine is indicated in inches by the pointers on the dial, as will be understood.

It should be understood that the latches for the plummets may be variously modified, as may be desired, for convenience in construction, as it is apparent that both of them may be similar latches of either type illustrated herein, or of other suitable construction.

Having thus described the invention, what I claim as new, is—

1. An angle indicator including a case, a guide-bar and also an axial shaft and an indicator dial mounted fixedly in the case, a rack-bar supported movably by the guide-bar, a hollow shaft rotatable on the axial shaft and having a pinion thereon in contact with the rack-bar, a pointer secured to the hollow shaft opposite the dial, a plummet pivotally supported in the case, a coupling-rod operatively connected with the rack-bar to move the rack-bar, and a pivot connected adjustably to the plummet relatively to the support thereof and connecting the connecting-rod to the plummet.

2. An angle indicator including a case, a guide-bar mounted in the case, a rack-bar supported movably by the guide-bar, an axial shaft supported in the case, an indicator dial mounted in the case, a hollow shaft rotatable on the axial shaft and having a pinion thereon in engagement with the rack-bar, a pointer secured to the hollow shaft opposite the dial, and a plummet pivotally supported in the case and operatively connected with the rack-bar.

3. An angle indicator including a case, a guide-bar mounted in the case, a rack-bar supported movably by the guide-bar, an axial shaft supported in the case, an indicator dial mounted in the case, a hollow shaft rotatable on the axial shaft and having a pinion thereon in engagement with the rack-bar, a pointer secured to the hollow shaft opposite the dial, a lever pivoted in the case and connected operatively with the rack-bar, a plummet pivotally supported in the case, and a coupling-bar connected to the plummet and also to the lever.

4. An angle indicator including a case, a guide-bar mounted in the case, a rack-bar supported movably by the guide-bar, an axial-shaft supported in the case, an indicator dial mounted in the case, a hollow shaft rotatable on the axial shaft and having a pinion thereon in engagement with the rack-bar, a bell-crank pivoted in the case, a connecting-rod pivoted to the bell-crank and also to the rack-bar, a plummet pivotally supported in the case, and a coupling-rod pivoted to the bell-crank and also to the plummet.

5. An angle indicator comprising a case, an axial shaft and also an indicator dial mounted fixedly in the case, two rack-bars mounted movably in the case, a hollow shaft rotatable on the axial shaft and having a pinion thereon in contact with one of the rack-bars, a pointer secured to the hollow shaft opposite the dial, a second hollow shaft rotative on the first-mentioned hollow shaft and having a pinion thereon in contact with the other one of the two rack-bars, a pointer secured to said second hollow shaft opposite the dial, two plummets mounted pivotally in the case to swing in different planes, a coupling-rod operatively connected with one of the rack-bars to move the same, a pivot connected adjustably to one of the plummets relatively to the support of the plummet and connecting the plummet to the connecting-rod, a bell-crank pivotally mounted in the case and operatively connected with the other one of the two rack-bars to move the same, a coupling-rod pivotally connected to the bell-crank, a pivot connected adjustably to the other one of the two plummets relatively to the support of the plummet and connecting the plummet to the connecting-rod, means for locking one of said plummets to prevent movement thereof, and means for locking the other one of said plummets to prevent movement thereof.

In testimony whereof, I affix my signature in presence of two witnesses.

WILLIAM T. McPHETRIDGE.

Witnesses:
SAM SANDERS,
W. C. HOKE.